United States Patent
Sawada et al.

(10) Patent No.: US 9,546,653 B2
(45) Date of Patent: Jan. 17, 2017

(54) ELECTROMAGNETIC VALVE AND HIGH PRESSURE PUMP USING THE SAME

(71) Applicants: DENSO CORPORATION, Kariya, Aichi-pref. (JP); NIPPON SOKEN, INC., Nishio, Aichi-pref. (JP)

(72) Inventors: Yasuhiro Sawada, Obu (JP); Yutaka Miyamoto, Takahama (JP); Shinichiro Koshimoto, Kariya (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 269 days.

(21) Appl. No.: 14/192,281

(22) Filed: Feb. 27, 2014

(65) Prior Publication Data
US 2014/0241924 A1 Aug. 28, 2014

(30) Foreign Application Priority Data
Feb. 28, 2013 (JP) .................... 2013-38714

(51) Int. Cl.
| | |
|---|---|
| F04B 49/22 | (2006.01) |
| F04B 1/04 | (2006.01) |
| F04B 53/10 | (2006.01) |
| F04B 7/00 | (2006.01) |
| F16K 41/12 | (2006.01) |

(52) U.S. Cl.
CPC ............. *F04B 49/22* (2013.01); *F04B 1/0452* (2013.01); *F04B 7/0076* (2013.01); *F04B 53/1082* (2013.01); *F16K 41/12* (2013.01)

(58) Field of Classification Search
CPC ....... F04B 49/22; F04B 1/0452; F04B 7/0076; F04B 53/1082; F04B 39/10; F04B 39/08; F04B 39/0055; F04B 39/0061
See application file for complete search history.

(56) References Cited

U.S. PATENT DOCUMENTS

| | | | |
|---|---|---|---|
| 2007/0085644 A1* | 4/2007 | Asaka | .............. B22F 7/08 335/251 |
| 2012/0090708 A1* | 4/2012 | Usui | ............. F02M 63/0017 137/565.16 |

* cited by examiner

*Primary Examiner* — Charles Freay
*Assistant Examiner* — Thomas Cash
(74) *Attorney, Agent, or Firm* — Nixon & Vanderhye P.C.

(57) ABSTRACT

An electromagnetic body has a movable core reciprocatably movable within a movable core chamber. The movable core has through holes and a fitting hole that pass through the movable core in a direction of movement of the movable core. A stator core facing the movable core defines the movable core chamber together with the electromagnetic body. A valve stem is fixed into the fitting hole and has a fluid chamber recessed from a first end surface facing the stator core. Air bubbles generated in a gap can be guided into the fluid chamber and collapse by flow of the fuel flowing into the fluid chamber from the through holes through the gap.

7 Claims, 6 Drawing Sheets

ELECTROMAGNETIC VALVE AND HIGH PRESSURE PUMP USING THE SAME

CROSS REFERENCE TO RELATED APPLICATION

This application is based on and incorporates herein by reference Japanese Patent Application No. 2013-38714 filed on Feb. 28, 2013.

TECHNICAL FIELD

The present disclosure relates to an electromagnetic valve and a high pressure pump using the same.

BACKGROUND

A high pressure pump for pressurizing fuel to be supplied to an internal combustion engine has been conventionally known. The high pressure pump may include an electromagnetic valve for controlling operation of a suction valve. The suction valve is configured to open and close a supply passage connected to a pump chamber in which the fuel is pressurized.

For example, a patent document 1 (JP 2012-82809 A) discloses an electromagnetic valve disposed in a high pressure pump. The electromagnetic valve includes a movable core reciprocatably disposed in a core chamber and a valve stem fixed to the movable core. The valve stem is pressed toward a pump chamber by biasing force of a spring a suction valve to open a supply passage. When the movable core is magnetically attracted toward a stator core, the valve stem releases pressure force against the suction valve.

However, in the electromagnetic valve disclosed in the patent document 1, surfaces of the movable core and the stator core may be eroded due to cavitation generated by fuel pressure fluctuation between the movable core and the stator core when the movable core reciprocates in the core chamber.

Generally, the movable core and the stator core are made of a soft magnetic material and thus may be easily susceptible to the erosion. When the surfaces of the movable core and the stator core are eroded, a gap between the movable core and the stator core may become larger. Therefore, a response time required to complete the operation of the movable core after applying electricity to the electromagnetic valve may become longer.

Further, foreign materials resulting from the erosion of the movable core and the stator core may be mixed with the fuel, and hinder operation of the high pressure pump.

SUMMARY

It is an objective of the present disclosure to provide an electromagnetic valve and a high pressure pump having increased durability to erosion.

To achieve the objective of the present disclosure, an electromagnetic valve has a movable core within a movable core chamber. The movable core has a through hole and a fitting hole that pass through the movable core in a direction of movement of the movable core. A valve stem fixed into the fitting hole has a fluid chamber recessed from an end surface of the movable core that faces a stator core.

According to the electromagnetic valve of the present disclosure, when pressure fluctuation of the liquid in a gap between the movable core and the stator core occurs during reciprocation of the movable core in the core chamber, air bubbles generate in the liquid. The air bubbles are guided deep to an inner side of the fluid chamber by flow of the liquid flowing into the fluid chamber through the gap from the through hole of the movable core. Simultaneously, the fuel in the fluid chamber is pressurized, and thus the air bubbles are collapsed at the inner side of the fluid chamber. Therefore, the erosion by cavitation between the movable core and the stator core can be suppressed. Further, since a fatigue strength of the valve stem is proportional to a material hardness of the valve stem, the erosion on an inner wall of the liquid chamber formed in the valve stem can be suppressed by adopting a material of the valve stem having a high hardness.

To achieve the objective of the present disclosure, a high pressure pump may have a valve stem fixed to a movable core. The valve stem core has a fluid chamber recessed from an end surface of the movable core that faces a stator core toward a suction valve.

According to the high pressure pump of the present disclosure, the high pressure pump has same effects as the above electromagnetic valve.

BRIEF DESCRIPTION OF THE DRAWINGS

The disclosure, together with additional' objectives, features and advantages thereof, will be best understood from the following description, the appended claims and the accompanying drawings, in which:

DETAILED DESCRIPTION

Figure 1:
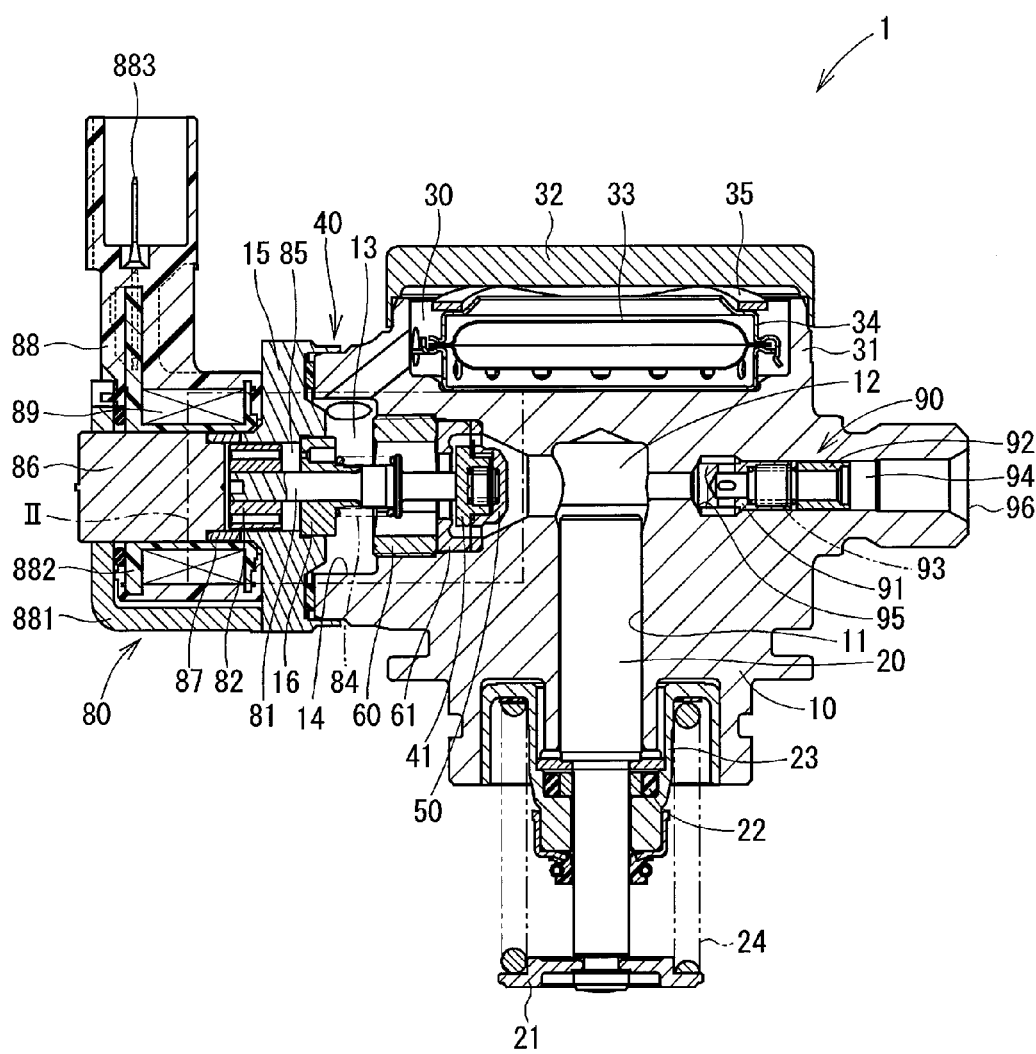
FIG. 1 is a sectional view of a high pressure pump according to a first embodiment of the present disclosure.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

It is noted that FIGS. 1 to 6 depict a gap between a movable core and a stator core that is larger than an actual size in order to facilitate understanding the description of the present disclosure.

The First Embodiment

FIGS. 1 to 5 illustrate a first embodiment of the present disclosure. An electromagnetic valve of the first embodiment may be used for an electromagnetic drive component 80 for driving a high pressure pump 1. The high pressure pump 1 is provided to a fuel supplying system (not shown) for supplying fuel to an internal combustion engine. The fuel pumped up from a fuel tank is pressurized by the high pressure pump 1 and accumulated into a delivery pipe. The fuel is injected by an injector connected to the delivery pipe to respective cylinders of the engine. The fuel in the present embodiment may be one example of a "liquid".

As shown in FIG. 1, the high pressure pump 1 may include a pump body 10, a plunger 20, a damper chamber 30, a valve component 40, the electromagnetic drive component 80, a discharge valve component 90 or the like.

A cylinder 11 is provided to the pump body 10. The plunger 20 is housed in the cylinder 11 and is capable of reciprocating in an axial direction of the plunger 20. The plunger 20 has a tip end that projects from the pump body 10. A spring seat 21 is attached to the tip end of the plunger 20. An oil seal holder 23 is attached to the pump body 10 to hold an oil seal 22 positioned around an outer circumference of the plunger 20. A spring 24 is disposed between the spring seat 21 and the oil seal holder 23. The plunger 20 is biased toward a camshaft (not shown) of the engine by the spring 24. Accordingly, the plunger 20 is reciprocated in the axial direction according to a cam profile of the camshaft. With the reciprocation of the plunger 20, volume of the pump chamber 12 is changed and the fuel is sucked and pressurized in the pump chamber 12.

Next, the damper chamber 30 will be described.

A cylindrical part 31 protruding in a direction away from the cylinder 11 is formed to the pump body 10. The damper chamber 30 is defined by covering the cylindrical part 31 with a cylindrical cover 32.

A pulsation damper 33, a support 34, and a wave spring 35 are housed in the damper chamber 30.

The pulsation damper 33 is formed by two metallic diaphragms, and a gas at a given pressure is sealed inside the pulsation damper 33. Fuel pressure pulsation in the damper chamber 30 is reduced by elastic deformation of the two metallic diaphragms according to pressure changes in the damper chamber 30.

The pulsation damper 33 and the damper chamber 30 are not necessarily required when the fuel pressure pulsation is so small as to have little effect on a vehicle that is provided with the high pressure pump 1.

The damper chamber 30 communicates with a fuel inlet (not shown) through a fuel passage (not shown). The fuel is supplied to the fuel inlet from the fuel tank (not shown). As a result, the fuel from the fuel tank is supplied to the damper chamber 30 through the fuel inlet.

Next, the valve component 40 will be described.

The valve component 40 is provided in a supply passage 13 connecting the pump chamber 12 with the damper chamber 30 and configured to open and close the opening of the supply passage 13. The valve component 40 is formed by a suction valve 41 and a stopper 50.

The pump body 10 has a recess 14 that opens in a direction perpendicular to a central axis of the cylinder 11. The supply passage 13 extending from the damper chamber 30 to the pump chamber 12 is defined by covering an opening of the recess 14 with an electromagnetic body 15.

Figure 2:
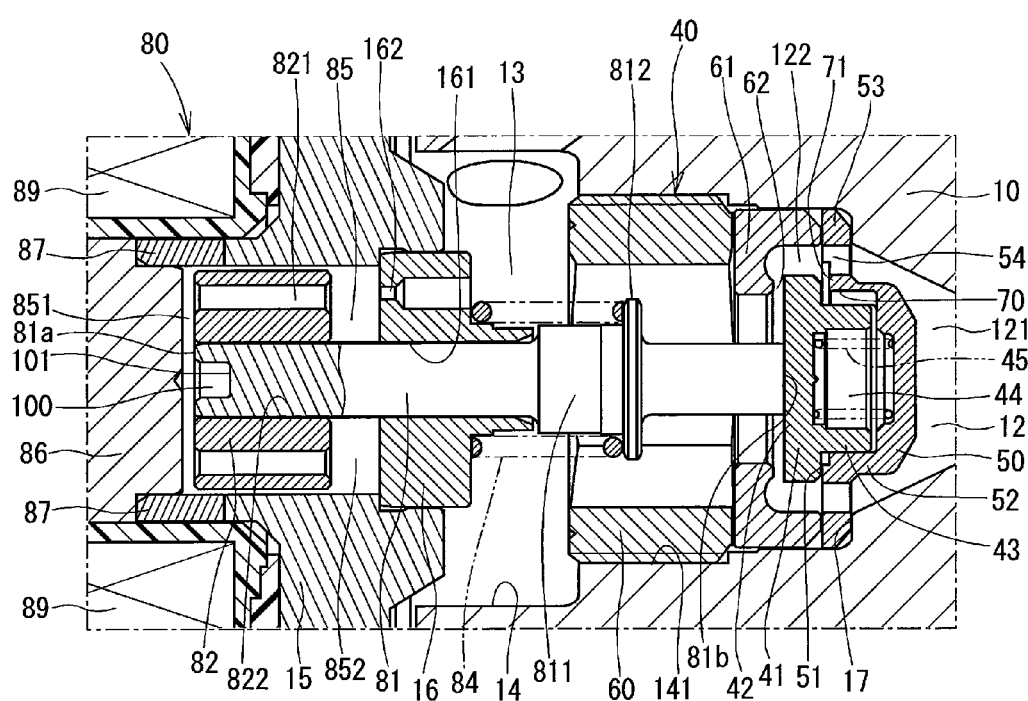
FIG. 2 is an enlarged view indicated by a section II in FIG. 1.

As shown in FIG. 2, a cylindrical part 60, a seat part 61, the suction valve 41, and the stopper 50 are arranged in this order within the supply passage 13 in a direction from the electromagnetic body 15 to the pump chamber 12.

The cylindrical part 60 is screwed to a female screw 141 (see FIG. 3) formed on an inner circumference of the supply passage 13. The seat part 61 and the stopper 50 are pressed against a step 17 of the pump body 10 by screwing the cylindrical part 60 into the female screw 141, and are fixed to the pump body 10.

The seat part 61 has a cylindrical shape, and an annular seat 62 is formed on a side of the seat part 61 facing the stopper 50. The pump chamber 12 is defined as a space from the seat 62 toward the cylinder 11.

The suction valve 41 has a valve body 42 and a first guide 43.

The valve body 42 is formed into a disc-like shape and is capable of seating on and separating from the seat 62 of the seat part 61. When the suction valve 41 seats on the seat 62, the suction valve 41 cuts off communication between the supply passage 13 and the pump chamber 12. Whereas, when the suction valve 41 separates from the seat 62, the suction valve 41 allows communication between the supply passage 13 and the pump chamber 12.

The valve body 42 has a first valve end surface facing the seat 62 and a second valve end surface opposite to the first valve end surface. The second valve end surface of the valve body 42 contacts against a contact part 51 of the stopper 50. As a result, the suction valve 41 is prohibited from moving in an opening direction (i.e., a direction away from the seat 62) when the second valve end surface of the valve body 42 contacts against the contact part 51.

The first guide 43 of the suction valve 41 has a cylindrical shape and extends in a direction opposite to the seat 62 from the valve body 42. An outer circumference of the first guide 43 slidably contacts an inner circumference of a second guide 52 of the stopper 50. By guiding the first guide 43 with the second guide 52 of the stopper 50, the suction valve 41 can be prohibited from deviating from or inclining to the seat 62. Further, the suction valve 41 may more accurately seat on or separate from the seat 62.

The stopper 50 includes the contact part 51, the second guide 52, a collar 53, and holes 54, and is configured to limit movement of the suction valve 41 in the opening direction.

The contact part 51 of the stopper 50 is formed into a disc-like shape and contacts the second valve end surface of the valve body 42.

The second guide 52 of the stopper 50 has a cylindrical shape and extends in a direction opposite to the seat 62 from the contact part 51. The second guide 52 slidably contacts the outer circumference of the first guide 43 of the suction valve 41.

The collar 53 of the stopper 50 outwardly extends in a radial direction from the contact part 51 and is fixed to the inner circumference of the supply passage 13. The collar 53 partitions the pump chamber 12 into a plunger chamber 121 positioned close to the plunger 20 and a seat chamber 122 positioned close to the seat 62.

The collar 53 of the stopper 50 is formed with a plurality of the holes 54 passing through the collar 53 in a thickness direction of the collar 53. The plurality of the holes 54 are arranged in a circumferential direction of the collar 53 and communicate between the plunger chamber 121 and the seat chamber 122.

A plurality of shaft grooves 70 (e.g., the four shaft grooves) are formed on the inner wall of the second guide 52 of the stopper 50 in a circumferential direction.

The contact part 51 of the stopper 50 has an end surface facing the valve body 42. A plurality of radial grooves 71 (e.g., the four shaft grooves) are formed on the end surface of the contact part 51. The radial grooves 71 communicate between the shaft grooves 70 and holes 54.

A valve chamber 44 that houses a first spring 45 is defined between the suction valve 41 and the stopper 50.

The pump chamber 12 and the valve chamber 44 communicate with each other through the radial grooves 71, the shaft grooves 70, and a clearance defined between the first groove 43 and the second groove 52.

A total area of four flow cross-sectional areas of the radial grooves 71 is smaller than a total area of a flow cross-sectional area of the clearance between the first guide 43 and the second guide 52 and four flow cross-sectional areas of the shaft grooves 70.

Therefore, when the suction valve 41 is in an open state in which the suction valve 41 is separated from the seat 62, a flow rate of the fuel flowing through the valve chamber 44 and the pump chamber 12 depends on the total area of the four cross-sectional areas of the radial grooves 71. Accordingly, by reducing the flow cross-sectional area of the radial groove 71, the flow rate of the fuel flowing into the valve chamber 44 during a metering stroke of the high pressure pump can be reduced. As a result, an increase of fuel pressure in the valve chamber 44 is reduced, and thus, a "self-closing limit rotation speed" can be increased.

It is be noted that this "self-closing limit rotation speed" is a rotation speed of the camshaft when the suction valve is automatically closed by the fuel pressure in the valve chamber 44 or dynamic pressure of the fuel flowing into the supply passage 13 from the pump chamber 12 during the metering stroke of the high pressure pump.

Whereas, when the suction valve 41 is in a closed state in which the suction valve 41 contacts against the seat 62, a space is formed over the entire periphery between the second valve end surface of the valve body 42 and the contact part 51 of the stopper 50. Therefore, a flow rate of the fuel flowing into the pump chamber 12 from the valve chamber 44 depends on the total area of the flow cross-sectional areas of the clearances between the first guide 43 and the second guide 52 and the four flow cross-sectional areas of the shaft grooves 70. Accordingly, by expanding the flow cross-sectional area of the shaft groove 70, the fuel can efficiently flow into the pump chamber 12 from the valve chamber 44 during the suction stroke of the high pressure pump 1. As a result, the fuel in the valve chamber 44 can be prohibited from serving as fluid resistance to the suction valve 41 and the suction valve 41 can be smoothly opened, bringing about an increase of fuel suction efficiency.

Next, the electromagnetic drive component 80 will be described.

The electromagnetic drive component 80 is one of examples of an "electromagnetic valve" recited in the claims.

The electromagnetic drive component 80 has the electromagnetic body 15, a movable core 82, a stator core 86, a second spring 84 as a biasing part, a coil 89, and a valve stem 81.

The electromagnetic body 15 is provided to cover the opening of the recess 14. A stem guide 16 is fixed inside the electromagnetic body 15. The stem guide 16 defines a movable core chamber 85 together with the electromagnetic body 15. The stem guide 16 has a sliding hole 161 passing through a center area of the stem guide 16. The stem guide 16 slidably holds the valve stem 81 inserted into the sliding hole 161 in an axial direction of the valve stem 81. The stem guide 16 has an orifice 162 that communicates between the movable core chamber 85 and the supply passage 13.

The valve stem 81 may be made from a material of high hardness such as a martensitic stainless steel. One end of the valve stem 81 is pressed and fixed into a fitting hole 822 formed to pass through the movable core 82 in a direction of movement of the movable core 82, while the other end of the valve stem 81 is capable of contacting the suction valve 41.

The valve stem 81 has an enlarged part 811 protruding in an outwardly radial direction of the valve stem 81 from an outer circumferential of the valve stem 81. The enlarged part 811 is positioned between the seat 62 and the stem guide 16.

Further, the valve stem 81 has a flange 812 protruding in the outwardly radial direction of the valve stem 81 from the outer circumferential of the valve stem 81 in the supply passage 13. The second spring 84 is provided between the flange 812 and the stem guide 16. The second spring 84 biases the valve stem 81 toward the pump chamber 12 with greater force than the force of the first spring 45.

The movable core 82 is made from a soft magnetic material such as a ferritic stainless steel and reciprocatably housed in the movable core chamber 85 in an axial direction. The movable core 82 has through holes 821 passing through the movable core 82 along a direction of movement of the movable core 82. The through holes 821 are arranged at equal intervals in a circumferential direction around the movable core 82. A size of a cross sectional area of the through holes 821 and number of the through holes 821 are determined such that a sufficient amount of the fuel can be supplied into the gap 851 when the movable core 82 moves away from the stator core 86.

The stator core 86 is made from a soft magnetic material such as a ferritic stainless steel. The stator core 86 is disposed in the movable core chamber 85 at a positioned farther from the suction valve 41 than the movable core 82. The stator core 86 faces the movable core 82. An annual part 87 made from a nonmagnetic material is sandwiched between the stator core 86 and the electromagnetic body 15. The stator core 86 defines the movable core chamber 85 together with the electromagnetic body 15.

When the movable core 82 moves toward the stator core 86 and the enlarged part 811 of the valve stem 81 contacts the stem guide 16, a small space is formed between the movable core 82 and the stator core 86. In other words, the electromagnetic valve (i.e., the electromagnetic drive component 80) of the present embodiment is a so-called air gap electromagnetic valve in which the movable core 82 does not contact the stator core 86.

The valve stem 81 has a first end surface 81a facing the stator core 86 and a second end surface 81b opposite to the first end surface 81a. A fluid chamber 100 is formed with the valve stem 81 that is recessed from the first end surface 81a. More specifically, the fluid chamber 100 is recessed from the first end surface 81a toward the second end surface 81b (i.e., the suction valve 41). The fluid chamber 100 has a substantially cylindrical shape and is defined by an inner wall 101 and a sidewall 102. The inner wall 101 of the fluid chamber 100 is formed as a plane perpendicular to an axis of the valve stem 81 and faces the stator core 86. The sidewall 102 is parallel to the axis of the valve stem 81 and perpendicular to the inner wall 101. A volume of the fluid chamber 100 is larger than that of the gap 851 between the movable core 82 and the stator core 86. Further, the volume of the fluid chamber 100 is set to be larger than the volume of the gap 851 so that an impact per unit area due to cavitation can be reduced and erosion on an inner surface of the fluid chamber 100 can be prevented. More specifically, an inside diameter of the fluid chamber 100 may be 1.5 mm and a depth of the fluid chamber 100 may be 1.5 mm, which is suitable for a electromagnetic valve having an outside diameter of the movable core 82 with 9.57 mm.

Supposing that the fluid chamber 100 has a small inside diameter, it may be difficult to guide sufficient air bubbles into the fluid chamber 100. On the contrary, when the fluid chamber 100 has a large diameter, the air bubbles can be efficiently guided to the fluid chamber 100 and erosion of the stator core 86 and the movable core 82 (i.e., in the gap 851) can be reduced.

However, when the fluid chamber 100 has a larger inside diameter, the thickness of the valve stem 81 around the fluid chamber 100 may be decreased. As a result, a fixing force between the valve stem 81 and the movable core 82 around the fluid chamber 100 to fix the valve stem 81 into the fitting hole 822 may be also decreased. Therefore, the inside diameter of the fluid chamber 100 may be set such that the thickness of the valve stem 81 around the fluid chamber 100 (i.e., a thickness of the sidewall 102) can provide the sufficient fixing force between the valve stem 81 and the movable core 82. In other words, the thickness of the sidewall 102 is set according to a force (i.e., a fixing force) required to fix the valve stem 81 into the fitting hole 822.

Supposing that the fluid chamber 100 has a small depth, it may be difficult to guide the sufficient air bubbles into the fluid chamber 100. On the contrary, when the fluid chamber 100 has a large depth, the air bubbles can be efficiently guided to the fluid chamber 100 and the erosion generated at the stator core 86 and the movable core 82 can be reduced.

However, when the fluid chamber 100 has a larger depth, it may be difficult to clean inside the fluid chamber 100, especially a deep part of the fluid chamber 100. Thus, the depth of the fluid chamber 100 is set such that the fluid chamber 100, especially the deep part of the fluid chamber 100, can be cleaned.

As shown in FIG. 1, a connector 88 is provided at a position radially outward the stator core 86. The connector 88 is held by a cylindrical yoke 881 having a bottom. A bobbin 882 is disposed in the connector 88 and a coil 89 is wound around the bobbin 882. When the coil 89 is energized through a terminal 883, the coil 89 generates a magnetic field.

When the coil 89 is not energized, the movable core 82 moves away the stator core 86 by the biasing force of the second spring 84. As a result, the valve stem 81 is moved toward the pump chamber 12 and presses the suction valve 41.

When the coil 89 is energized, a magnetic flux flows through a magnetic circuit formed by the stator core 86, the movable core 82, the cylindrical yoke 881, and the electromagnetic body 15. Then, the movable core 82 is magnetically attracted and moved toward the stator core 86 against the biasing force of the second spring 84. As a result, the valve stem 81 stops pressing against the suction valve 41.

Next, a discharge valve component 90 will be described.

The discharge valve component 90 may include a discharge valve 91, a regulator 92, a spring 93 or the like.

The pump body 10 is formed with a discharge passage 94 extending in a direction perpendicular to the center axis of the cylinder 11. The discharge valve 91 is reciprocatably housed in the discharge passage 94. The discharge valve 91 opens and closes the discharge passage 94 by seating on and separating from a seat 95.

The regulator 92 is disposed between the discharge valve 91 and a fuel outlet port 96 and regulates a movement of the discharge valve 91 toward the fuel outlet port 96.

The spring 93 has one end part that contacts the regulator 92 and the other end part that contacts the discharge valve 91. The spring 93 biases the discharge valve 91 toward the seat 95.

When pressure of the fuel in the pump chamber 12 against the discharge valve 91 increases to be higher than a sum of the biasing force of the spring 93 and a pressure by the fuel on a downstream side of the seat 95 against the seat 95, the discharge valve 91 separates from the seat 95. As a result, the fuel is discharged from the fuel outlet port 96.

Whereas, when the pressure of the fuel in the pump chamber 12 against the discharge valve 91 decreases to be lower than the sum of the biasing force of the spring 93 and the pressure by the fuel on the downstream side of the seat 95 against the seat 95, the discharge valve 91 seats on the seat 95. As a result, backflow of the fuel into the pump chamber 12 is prohibited.

Next, an operation of the high pressure pump 1 will be described.

(1) Suction Stroke

When the camshaft is rotated and the plunger 12 is moved downward from a top dead position to a bottom dead position, the volume of the pump chamber 12 is increased and the pressure of the fuel is reduced. The discharge valve 91 seats on the seat 95, and the discharge passage 94 is closed.

Whereas, the suction valve 41 is moved, by differential pressure between the pump chamber 12 and the supply passage 13, toward the stopper 50 against biasing force by the first spring 45 to be in the closed state.

It is noted that an energization to the coil 89 is set to be stopped in a middle of a discharge stroke that is performed before the suction stroke. Therefore, the valve stem 81 is moved with the movable core 82 toward the suction valve 41 by the biasing force of the second spring 84 and presses the suction valve 41 toward the pump chamber 12.

By opening the suction valve 41, the fuel is supplied to the pump chamber 12 from the damper chamber 30 through the supply passage 13.

(2) Metering Stroke

When the camshaft is rotated and the plunger 20 is moved upward from the bottom dead position to the top dead position, the volume of the pump chamber 20 is decreased. In this case, since the energization to the coil 89 is stopped until a given timing, the movable core 82 separates from the stator core 86 by the biasing force of the second spring 84, and the valve stem 81 presses the suction valve 41 toward the pump chamber 12. As a result, the suction valve 41 is separated from the seat 62 and maintained in the open state.

By opening the suction valve 41, communication between the pump chamber 12 and the supply passage 13 is maintained. With this, the fuel at a low pressure that was suctioned into the pump chamber 12 is returned to the damper chamber 30 through the passage supply 13. Therefore, the pressure of the fuel in the pump chamber 12 can be prohibited from increasing.

(3) Discharge Stroke

The coil 89 is energized at a given timing in a middle of a moving upward of the plunger 20 from the bottom dead position to the top dead position and the coil 89 generates the magnetic field. Then, a magnetic attraction is generated between the stator core 86 and the movable core 82 by the magnetic field of the coil 89. When the magnetic attraction is greater than a difference between the biasing force of the second spring 84 and the biasing force of the first spring 45, the movable core 82 is moved toward the stator core 86. With this, the pressure by the valve stem 81 against the suction valve 41 is released. The suction valve 41 is moved toward the stator core 86 and contacts the seat 62 (i.e., the closed state) by the biasing force of the first spring 45 and by the dynamic pressure of the low pressure fuel discharged from the pump chamber 12 toward the damper chamber 30.

When the suction valve 41 is closed, the pressure of the fuel in the pump chamber 12 is increased as the plunger 20 is moved upward. When the pressure of the fuel in the pump chamber 12 against the discharge valve 91 is greater than the pressure of the fuel in the discharge passage 94 against the discharge valve 91 and the biasing force of the spring 93, the discharge valve 91 is opened. As a result, the high pressure fuel pressurized in the pump chamber 12 is discharged from the fuel outlet port 96 through the discharge passage 94.

It is noted that the energization to the coil 89 is stopped during a middle of the discharge stroke. In this case, since the pressure of the fuel in the pump chamber 12 against the suction valve 41 is greater than the biasing force of the second spring 84, the suction valve 41 is maintained in the closed state.

The pressure pump 1 repeats a cycle of the above strokes (1) to (3) while pressuring and discharging a necessary amount of the fuel for the engine.

Figure 3:
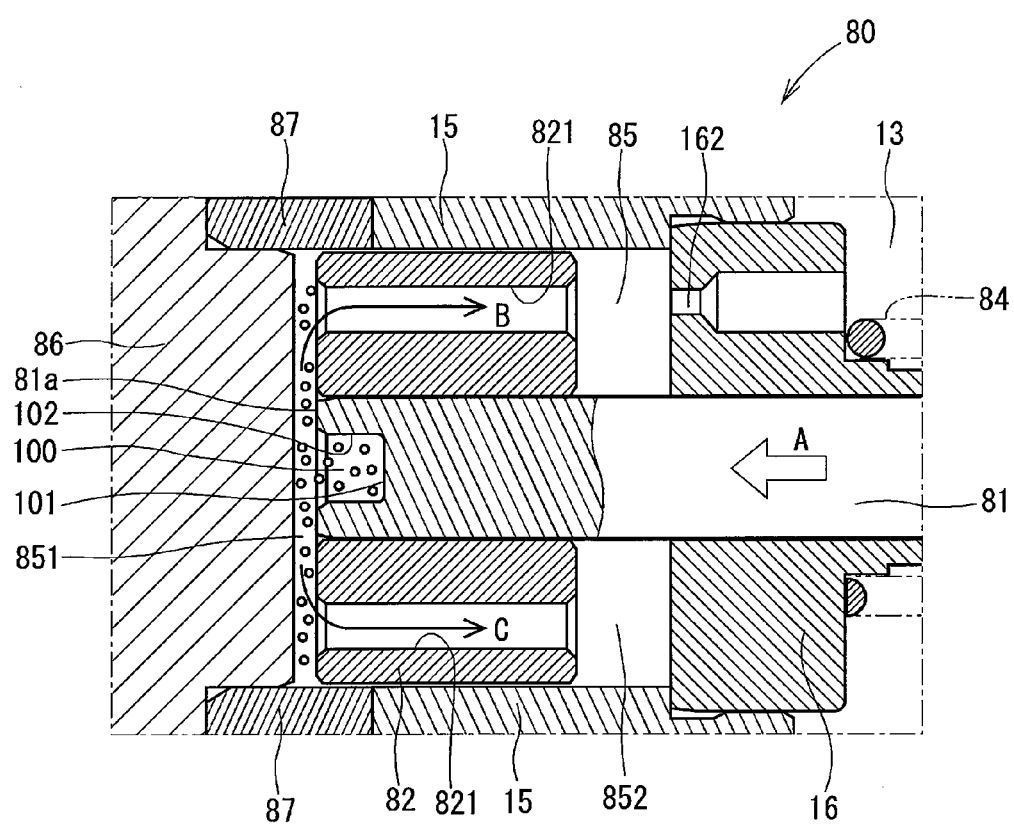
FIG. 3 is a sectional view illustrating an operation of an electromagnetic valve provided in the high pressure pump according to the first embodiment.
Figure 4:
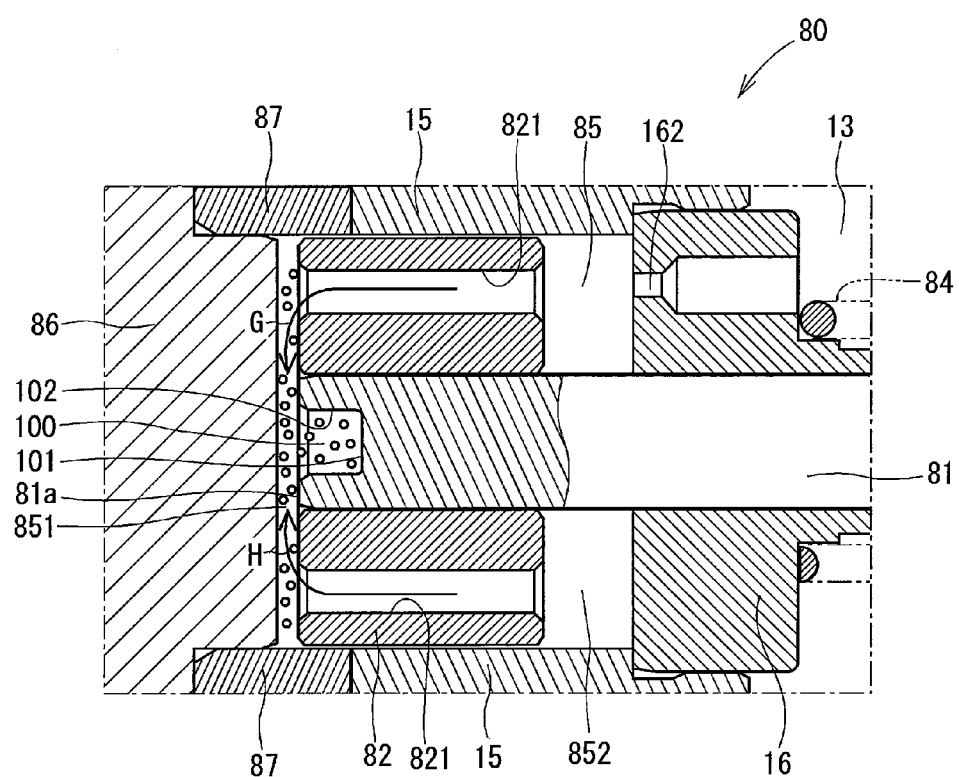
FIG. 4 is a sectional view illustrating an operation of the electromagnetic valve provided in the high pressure pump according to the first embodiment.
Figure 5:
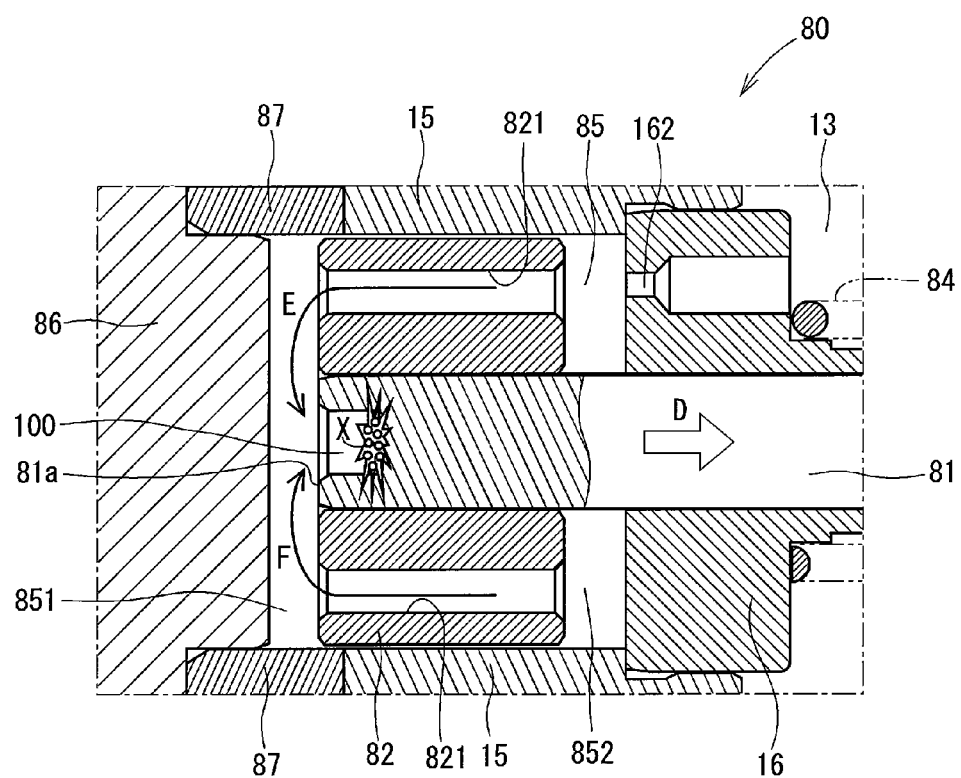
FIG. 5 is a sectional view illustrating an operation of the electromagnetic valve provided in the high pressure pump according to the first embodiment.

Next, a mechanism of reducing erosion in the movable core chamber 85 will be described referring to FIGS. 3 to 5. FIG. 3 illustrates a state in which the coil 89 is energized and the movable core 82 is magnetically attracted toward the stator core 86. FIG. 4 depicts a state in which the movable core 82 is fully lifted toward the stator core 86 and stopped. FIG. 5 shows a state in which the energization to the coil 89 is stopped and the movable core 82 moves away from the stator core 86 by the biasing force by the second spring 84.

In the operation of the high pressure pump 1, the states shown in FIGS. 3 to 5 are repeated. It is noted that, in FIGS. 3 to 5, the gap 851 between the movable core 82 and the stator core 86 is depicted larger than an actual size.

When the movable core 82 is magnetically attracted toward the stator core 86 (see an arrow A in FIG. 3), the fuel in the gap 851 flows into a space 852 in the movable core chamber 85 between the movable core 82 and the stem guide 16 through the through holes 821 (see arrows B and C).

The cross sectional area of each through hole 821 and the number of the through holes 821 are set such that the fuel in the gap 851 can effectively flow into the space 852 in the movable core chamber 85. Therefore, even after the enlarged part 811 of the valve stem 81 contacts the stem guide 16, and the movable core 82 is fully lifted and stopped, the fuel in the gap 851 and the fluid chamber 100 is discharged into the space 852 in the movable core chamber 85 due to inertial force by a fuel flow. As such, the fuel pressure in the gap 851 and the fluid chamber 100 is reduced, and, when the pressure is reduced lower than a saturation vapor pressure of the fuel, air bubbles are generated in the fuel.

As shown in FIG. 4, in a state in which the movable core 82 is fully lifted and stopped, the fuel pressure in the space 852 is higher than the fuel pressure in the gap 851 and the fluid chamber 100. Accordingly, the fuel in the space 852 of the movable core chamber 85 flows into the gap 851 and the fluid chamber 100 through the through holes 821 of the movable core 82. Therefore, the air bubbles generated in the gap 851 and the fluid chamber 100 are guided deep into the fluid chamber 100 with the fuel flowing into the gap 851 through the through holes 821. As a result, the fuel in the fluid chamber 100 is pressurized, resulting in the collapse of the air bubbles in the deep part of the fluid chamber 100.

As shown in an arrow D in FIG. 5, when the movable core 82 moves away from the stator core 86, the fuel pressure in the gap 851 and the fluid chamber 100 is momentarily reduced. When the fuel pressure is reduced lower than the saturation vapor pressure of the fuel, air bubbles are generated in the fuel. Thereafter, as shown by arrows E and F in FIG. 5, the fuel in the space 852 in the movable core chamber 85 flows through the gap 851 from the through holes 821, and then flows into the fluid chamber 100. Therefore, the air bubbles generated in the gap 851 and the fluid chamber 100 is guided deep into the fluid chamber 100 with the fuel flowing into the gap 851 through the through holes 821. As such, the fuel in the fluid chamber 100 is pressurized, resulting in the collapse of the air bubbles in the deep part of the fluid chamber 100. In FIG. 5, region X schematically indicates a position where the air bubbles collapse in the fluid chamber 100.

Since the valve stem 81 is a sliding member, the valve stem 81 is made from a material having a higher hardness than that of the movable core 82 and the stator core 86, both of which are made from a magnetic material. Further, fatigue strength is proportional to a material hardness. Thus, by collapsing the air bubbles in the fluid chamber 100, erosion of the movable core 82 and the stator core 86 can be suppressed.

Effects according to the above described embodiment are below.

(1) In the first embodiment, the through holes 821 pass through the movable core 82 in the direction of movement of the movable core 82, and the valve stem 81 fixed to the central part of the movable core 82 has the fluid chamber 100.

With this, the air bubbles generated in the gap 851 can be guided into the fluid chamber 100 of the valve stem 81 with the fuel flowing into the gap 851 through the through holes 821 and collapse in the fluid chamber 100. Therefore, erosion of the movable core 82 and the stator core 86 due to cavitation can be suppressed.

(2) In the first embodiment, the volume of the fluid chamber 100 is larger than that of the gap 851 between the stator core 86 and the movable core 82 when the movable core 82 is magnetically attracted toward the stator core 86. Therefore, the air bubbles generated in the gap 851 can be guided deep into the fluid chamber 100.

(3) In the first embodiment, a plurality of the through holes 821 of the movable core 82 are arranged at equal intervals in the circumferential direction of the movable core 82 around the valve stem 81.

With this, the fuel that flows into the gap 851 through the through holes 821 may then flow into the fluid chamber 100, and thus, the air bubbles generated in the gap 851 can be guided deep into the fluid chamber 100.

(4) Erosion may locally generate on a top of the tapered shape or the hemispherical shape when the inner wall 101 of the fluid chamber 100 has a tapered shape or a hemispherical shape.

However, according to the first embodiment, the inner wall 101 is formed as the plane perpendicular to the axis of the valve stem 81. Therefore, the air bubbles are dispersed and collapse at the bottom of the fluid chamber 100, and thus, the impact per unit area caused by cavitation can be reduced. As a result, erosion can be suppressed and contamination of the fuel by foreign substances can be prevented.

(5) In the first embodiment, the thickness of the valve stem 81 around the fluid chamber 100 is set such that the valve stem 81 can provide sufficient fixing force between the valve stem 81 and the movable core 82 around the fluid chamber 100.

With this, the volume of the fluid chamber 100 can be increased while providing sufficient fixing force between the valve stem 81 and the movable core 82 around the fluid chamber 100.

The Second Embodiment

Figure 6:
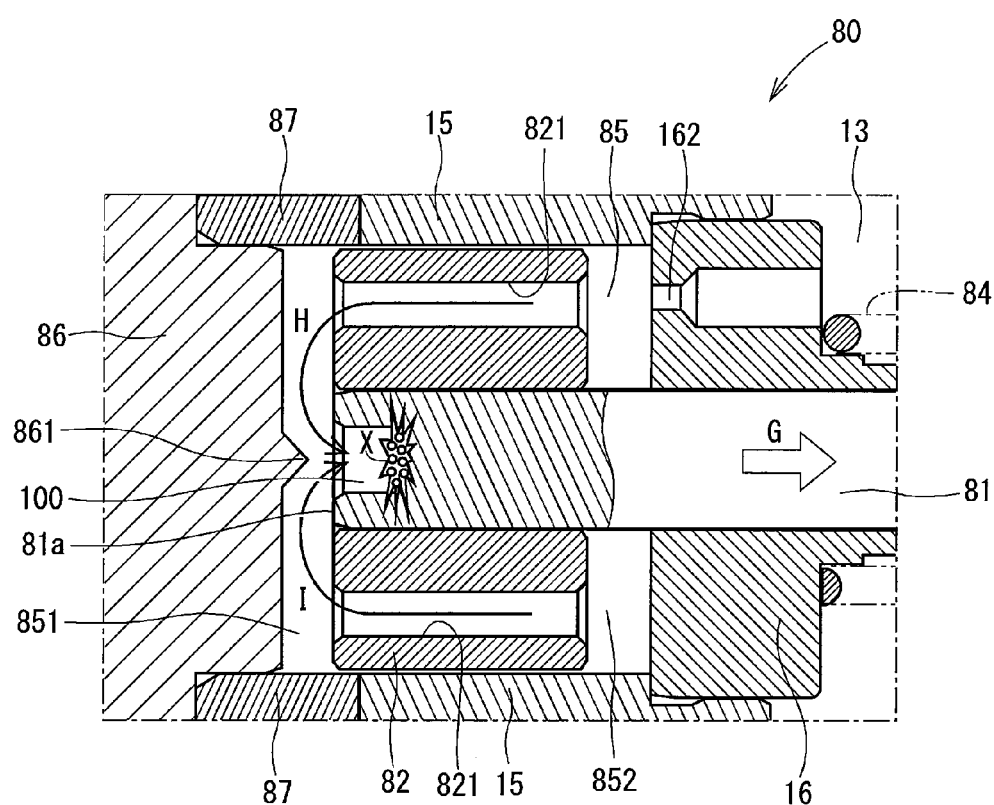
FIG. 6 is an enlarged view of a high pressure valve according to a second embodiment of the present disclosure.

A second embodiment of the present disclosure is shown in FIG. 6.

In the second embodiment, the stator core 86 has a protrusion 861. The protrusion 861 protrudes toward the fluid chamber 100 from an end surface of the stator core 86 that faces the movable core 82. The protrusion 861 is formed as a tapered shape that gradually narrows in a direction from the stator core 86 to the movable core 82.

With this, the fuel flowing through the gap 851 from the through holes 821 flows into the fluid chamber 100 along the protrusion 861. The air bubbles generated in the gap 851 and the fluid chamber 100 are guided deep into the fluid chamber 100 by a fuel flow into the fluid chamber 100 and collapse therein. In FIG. 6, region X schematically indicate a position where the air bubbles collapse in the fluid chamber 100.

According to the second embodiment, the air bubbles in the gap 851 between the stator core 86 and the movable core 82 can be effectively guided deep into the fluid chamber 100 along the tapered protrusion 861.

Other Embodiment

Although the present disclosure has been fully described in connection with the preferred embodiments thereof with reference to the accompanying drawings, it is to be noted that various changes and modifications will become apparent to those skilled in the art.

In the above described embodiments, the electromagnetic valve used for the high pressure pump is described. However, the electromagnetic valve is not necessarily limited to the usage for the high pressure pump, but may be used for various devices that control a flow of liquid.

In the above described embodiments, the inner wall of the fluid chamber that faces the stator core is formed as the plane perpendicular to the axis of the valve stem. But, in the other embodiment, the inner wall of the fluid chamber that faces the stator core may be formed as a tapered shape or a hemispherical shape.

Additional advantages and modifications will readily occur to those skilled in the art. The disclosure in its broader terms is therefore not limited to the specific details, representative apparatus, and illustrative examples shown and described.

What is claimed is:

1. An electromagnetic valve comprising:
an electromagnetic body having a movable core chamber;
a movable core reciprocatably movable within the movable core chamber and having a through hole and a fitting hole that pass through the movable core in a direction of movement of the movable core;
a stator core facing the movable core and defining the movable core chamber together with the electromagnetic body;
a biasing member biasing the movable core in a direction away from the stator core;
a coil configured to generate magnetic attraction between the stator core and the movable core when energized; and
a valve stem fixed into the fitting hole, wherein
the valve stem has an end surface facing the stator core and a fluid chamber recessed from the end surface of the valve stem,
the fluid chamber has an open end and a closed end opposite to the open end, and
the fluid chamber has only one opening.

2. The electromagnetic valve according to claim 1, wherein
a volume of the fluid chamber is larger than that of a gap formed between the movable core and the stator core when the movable core is magnetically attracted toward the stator core.

3. The electromagnetic valve according to claim 1, wherein
the movable core has a plurality of the through holes positioned around the valve stem, and
the plurality of the through holes are arranged at equal intervals in a circumferential direction of the movable core.

4. The electromagnetic valve according to claim 1, wherein
the closed end is an inner wall facing the stator core and perpendicular to an axis of the valve stem.

5. The electromagnetic valve according to claim 1, wherein
a material hardness of the valve stem is higher than that of the movable core and the stator core.

6. The electromagnetic valve according to claim 1, wherein
the stator core has a protrusion protruding toward the fluid chamber from an end surface of the stator core that faces the movable core, and
the protrusion has a tapered shape that narrows in a direction from the stator core to the movable core.

7. A high pressure pump comprising:
a plunger;
a pump body having a pump chamber, wherein the plunger is reciprocatably movable within the pump chamber to pressurize fuel;
a supply passage, through which the fuel is supplied to the pump chamber, formed in the pump body;
a suction valve that is configured to selectively seat on or separate from a seat formed on an inner wall of the supply passage to open or close communication between the pump chamber and the supply passage;
an electromagnetic body having a movable core chamber;
a movable core reciprocatably movable within the movable core chamber and having a through hole and a fitting hole that pass through the movable core in a direction of movement of the movable core;
a stator core that is disposed within the movable core chamber on a side opposite to the suction valve with respect to the movable core and faces the movable core;
a biasing member biasing the movable core toward the suction valve;
a coil configured to generate magnetic attraction between the stator core and the movable core when energized; and
a valve stem fixed into the fitting hole and pressing the suction valve toward the pump chamber, wherein
the valve stem has an end surface facing the stator core and a fluid chamber recessed from the end surface of the valve stem,
the fluid chamber has an open end and a closed end opposite to the open end, and
the fluid chamber has only one opening.

\* \* \* \* \*